United States Patent [19]

Hayes

[11] Patent Number: 4,650,572

[45] Date of Patent: Mar. 17, 1987

[54] FILTER DEVICE HAVING BAFFLE RETAINER FOR DEFLECTING FLUID FLOW AND PREVENTING FILTER CLOGGING

[75] Inventor: William Hayes, Elmont, N.Y.

[73] Assignee: Arc Rebuilders, Inc., Astoria, N.Y.

[21] Appl. No.: 730,844

[22] Filed: May 6, 1985

[51] Int. Cl.⁴ .............................................. B01D 29/14
[52] U.S. Cl. ...................................... 210/131; 55/313;
55/314; 210/168; 210/445; 210/446
[58] Field of Search ............... 210/445, 446, 167, 131,
210/168, 416.5, 130, 132; 55/314, 313; 422/113,
115; 137/843, 852, 859

[56] References Cited

U.S. PATENT DOCUMENTS 4,517,083  5/1985  Hayes ...................................... 55/314

Primary Examiner—Frank Sever
Attorney, Agent, or Firm—Philip Young

[57] ABSTRACT

A filter device for removing fine particles in the fluid line, such as in a power steering system including a housing having an inlet body wall and an outlet body wall connecting respectively with an inlet tube and an outlet tube. A perforated support plate has a valve seat formed around a central opening and is mounted between the inlet body wall and the outlet body wall for separating the housing interior into an inlet chamber and an outlet chamber. The valve seat and a boss on the inlet body wall form a filter relief valve. A filter disc, made of a soft flexible material, is located in intimate contact with the support plate on the inlet chamber side of such plate for filtering the particles from the inlet fluid prior to the passage of the fluid through the filter disc and the holes in the support plate into the outlet chamber. A baffle retainer in the form of a U-shaped metal strap, is mounted on the inlet chamber wall and extends across the path of the fluid entering the inlet chamber from the inlet tube. The top portion of the U-shaped strap extends across the inlet chamber to a point adjacent to the side of the filter disc.

12 Claims, 12 Drawing Figures

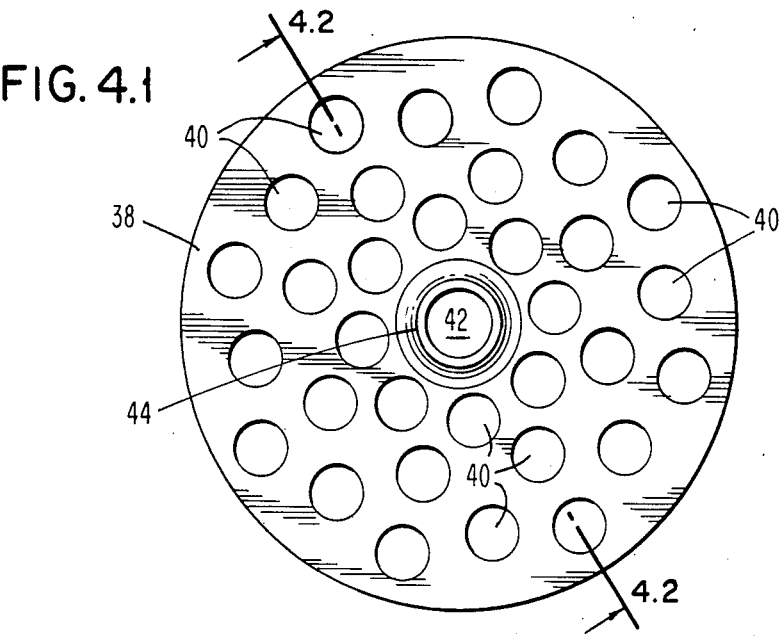
FIG. 4.1
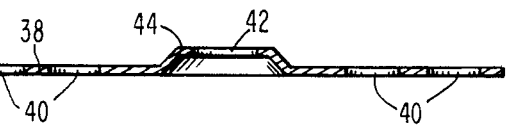
FIG. 4.2
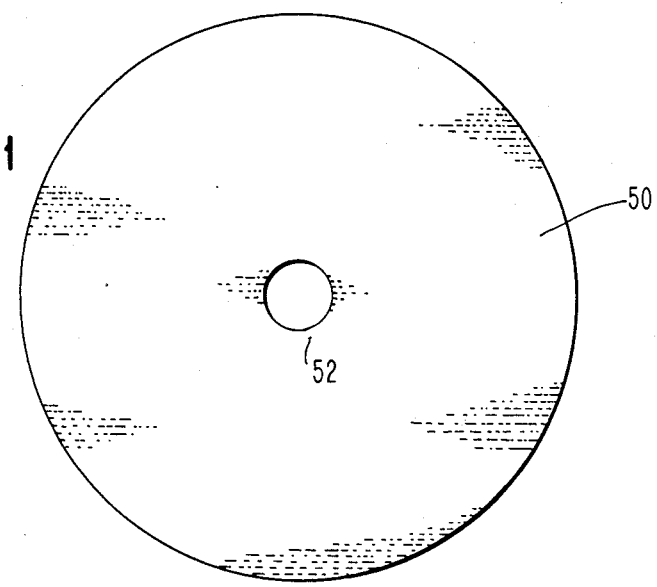
FIG. 5.1
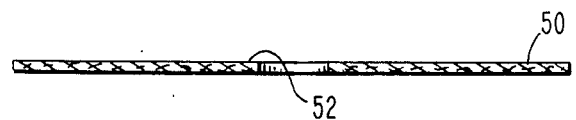
FIG. 5.2

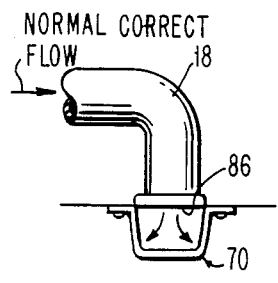
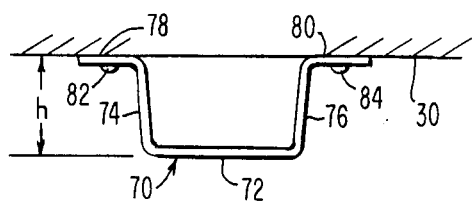
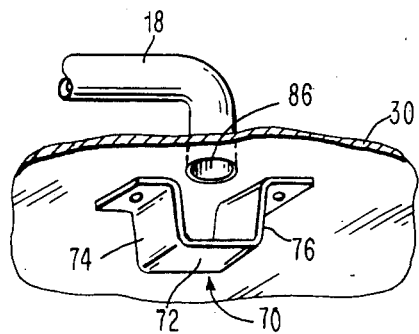
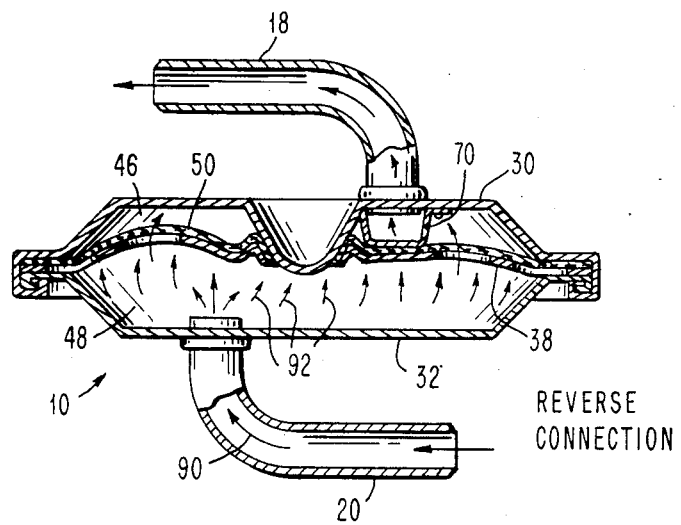
FIG. 7.1
FIG. 7.2
FIG. 7.3
FIG. 8

FILTER DEVICE HAVING BAFFLE RETAINER FOR DEFLECTING FLUID FLOW AND PREVENTING FILTER CLOGGING

TECHNICAL FIELD

The present invention relates to automotive filters, and more particularly relates to a filter for removing the fine particles in the fluid of a power steering system with a relief valve incorporated in the filter.

BACKGROUND ART

In the power steering systems of automobiles, solid particles developed through wear of the system parts are present in the fluid causing contamination, increased friction and raised fluid temperatures. These particles also increase deterioration of the hoses and seals. Therefore, it is desirable to refine the power steering fluid by filtering such particles. Presently, there are known filters which employ a paper filtering element together with a relief valve made of a combination spring, valve disc and seat arrangement. Such known filter devices are generally complex, involving the spring and valve seat arrangement, and therefore are expensive to manufacture. Also, such known filter devices are often not reliable due to the spring arrangement employed. There are other known types of filter devices being used in automobiles which are less expensive than the above-noted power steering filter devices but which are not suitable for the same purpose of filtering the fine particles existent in power steering systems and, consequently, such known filters also do not provide adequate and reliable relief valve means in the filter. Examples of such filters devices are the floating oil screens used in the oil sumps of engines as described in U.S. Pat. No. 2,192,432 to Gulick, U.S. Pat. No. 2,508,952 to Kline and U.S. Pat. No. 3,662,887 to Uhlhorn, Jr. Such patents disclose devices mounted or floating in the oil sump of an internal combustion engine to prevent sludge and the like from entering the oil pump. When the screen becomes badly clogged with foreign matter, the suction pull on the screen will open a valve formed by a portion of the screening element and a wall portion to allow oil flow without screening. In such known oil sludge filter devices, the wire screen element is intended for filtering out relatively large particles and sludge and is inappropriate for filtering fine particles, even if the screened mesh openings were made smaller. The screen material is highly flexible and subject to random deformation and, therefore, the screen valve may easily open under unintended variable and minor conditions not due to clogging, such as slight variations in suction pressure and very small build ups of heavy sludge against the very flexible screen causing a suction sufficient to move the screen valve into an open position. Also, the non-rigid nature of the screen material affords it no spring force to return it to its original closed position once the minor suction fluctuation is reduced to normal. This absence of rigidity, or memory, could result in the screen valve opening and remaining open even after the minor suction fluctuation is removed. This random deformation and uncontrolled shifting of the position of the screen element in such oil sludge filters results in a relief valve which cannot be designed for opening under predetermined, controlled conditions of filter clogging. Also, the valve seal formed by an element of the screen with the wall is generally a loose-acting seal made under slight pressures of the screen element on a wall. Thus, such a loose and uncontrolled sealing means as used in these oil sludge filter devices is not suitable for the requirements in filtering the fine particles in a power steering system.

In U.S. patent application No. 588,540 filed on March 12, 1984 by William Hayes and James Dohrenwend, now U.S. Pat. No. 4,517,083, the co-inventor William Hayes being the inventor of the present application and said application being assigned to the same assignee herein, there is described a filter device for use in the return line of a power steering system for filtering the fine metal particles in the power steering fluid. The Hayes et al filter device includes a filter disc made of a soft material and located in intimate contact with one side of a perforated support plate. The above described filter device by Hayes et al provides an effective filter for the fine particles present in a power steering system as well as a relief valve and seal therefor. Since the filter device is connected in the fluid line of a power steering system, the inlet tube and outlet tube are identified or marked to aid the installation person in connecting the power steering hoses to the appropriate inlet and outlet tubes.

However, in some installations, it is possible that the filter device is installed backwards due to the failure by the installation person to follow the instructions. This occurs when the input flow from the power steering gear is mistakenly connected to the outlet tube of the filter device. This backwards flow of fluid through the filter device might cause the soft felt filter disc to be forced against the inlet tube opening in a manner which, in time, may block such opening and prevent the passage of fluid out of the filter device. Therefore, it would be desirable to provide in such power steering filter device a means for preventing the blockage of fluid flow due to the incorrect, backward connection of the filter device in the power steering system.

Also, in filter devices used in some systems, such as the power steering system, the filter material may comprise a relatively large area, compared with the much smaller fluid inlet which directs the fluid under pressure towards the filter material. Therefore, it is desirable to have the fluid exiting from the inlet tube be dispersed so that there is no concentration of fluid, and particles, against the one small area of the filter material located directly opposite to the inlet tube.

SUMMARY OF THE INVENTION

Therefore, in view of the above, it is an object of the present invention to provide a filter device for removing fine particles in a power steering system which provides a generally uniform flow of inlet fluid onto the filter medium while also preventing inoperation in the event of improper connection of the filter device in the power steering system. It is another object to provide a filter device which prevents the blockage of fluid flow in the event of improper connection of the filter device in the power steering system. It is another object of the present invention to provide a filter device for removing fine particles in a pressurized fluid system which disperses the fluid being received in the inlet chamber while also providing a safety means for preventing inoperation caused by the improper backward installation of the filter device in the system.

These and other objects are achieved by the present invention which provides a filter device for removing fine particles in a power steering system which includes a housing having an upper body wall and a lower body wall connecting respectively with an inlet tube and an outlet tube for connecting the filter device in fluid communication with the return line of a power steering unit. A perforated support plate has a valve seat formed by an annular rim extending around a central opening and is mounted between the upper body wall and the lower body wall for separating the housing interior into an inlet chamber and an outlet chamber. A filter disc is located in intimate contact with the support plate on the inlet chamber side of such plate for filtering the particles from the inlet fluid prior to the passage of the fluid through the filter disc and the holes in the support plate into the outlet chamber. A baffle retainer in the form of a U-shaped metal strap, is mounted on the inlet chamber wall and extends across the path of the fluid entering the inlet chamber from the inlet tube. The baffle retainer acts as a baffle to deflect and disperse the stream of input fluid entering the inlet chamber out to the sides of the baffle retainer and away from its normal direction toward a small area of the filter disc. This provides a more uniform flow of the inlet fluid onto the filter disc.

The baffle retainer is designed with its top portion of the U-shaped strap extending across the inlet chamber to a point adjacent to the side of the filter disc for retaining such filter disc at a preset distance away from the inlet tube. In the event of an incorrect, backward connection of the filter device in the power steering system, the baffle retainer holds the filter disc and prevents it from obstructing the opening to the inlet tube thereby preventing inoperation of the filter device.

A relief valve is provided by the combination of the aligned central opening in both the support plate and the adjacent filter disc together with a boss in the upper body wall which extends into such central opening and sealingly presses the annular rim of filter material against the valve seat on the support plate for closing off the relief valve opening under normal filtering conditions. The flexure of the support plate is designed so that when the filter becomes clogged with particles to cause a build up of fluid pressure by a predetermined amount, the support plate flexes and moves away from the valve boss, thereby permitting the fluid to bypass the filter material and pass into the outlet chamber via the relief valve opening.

BRIEF DESCRIPTION OF THE DRAWINGS

FIG. 4.1 and FIG. 4.2 are a respective top view and a cross-sectional elevation view of the perforated support plate;

FIG. 5.1 and FIG. 5.2 are a respective top view and a cross-sectional elevation view of the filter disc.

FIG. 7.1 is a top view, FIG. 7.2 is a side view and FIG. 7.3 is a perspective view of the baffle retainer that is attached to the upper body wall; and FIG. 8 shows the interior of the filter device and the action of the baffle retainer upon the filter disc when the filter device has mistakenly been connected backward in the fluid line.

DESCRIPTION OF THE PREFERRED EMBODIMENTS

Figure 1:
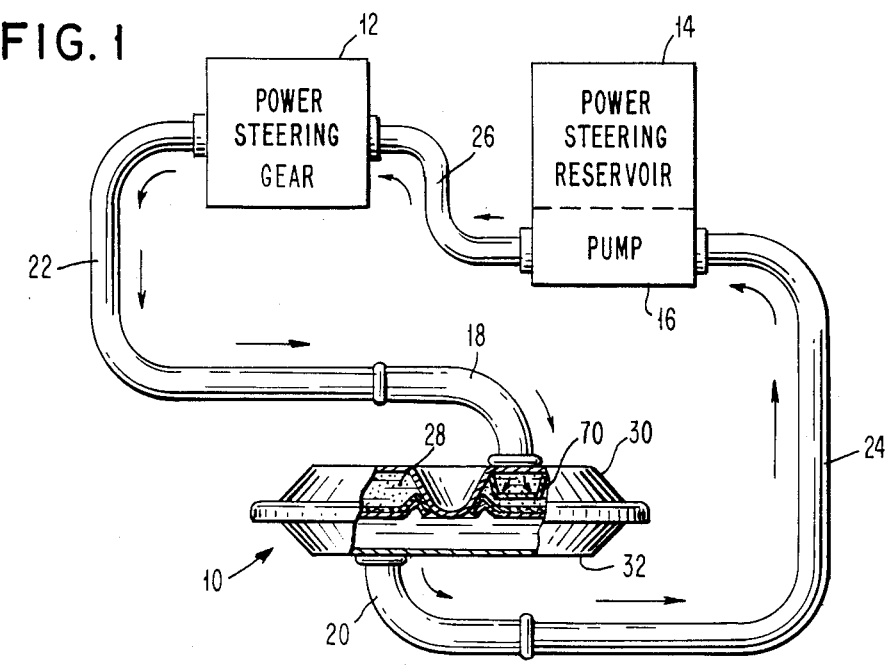
FIG. 1 shows the filter device of the present invention connected in a power steering system with a portion of the filter device being broken away to show the interior thereof.

Referring to FIG. 1 there is shown the filter device 10 connected in a power steering system having a power steering gear 12, and a power steering reservoir 14, for a power steering pump 16. Power steering unit 10 has a housing to which are attached a fluid inlet tube 18 and an outlet tube 20 in the return lines 22 and 24, respectively, for the fluid to the power steering pump 16 and the reservoir 14. Fluid from the power steering pump 16 is communicated to the power steering gear 12 via a fluid line 26 shown. The fine particles suspended in the power steering fluid are indicated by numeral 28 in the broken away view of the filter device 10.

Figure 2:
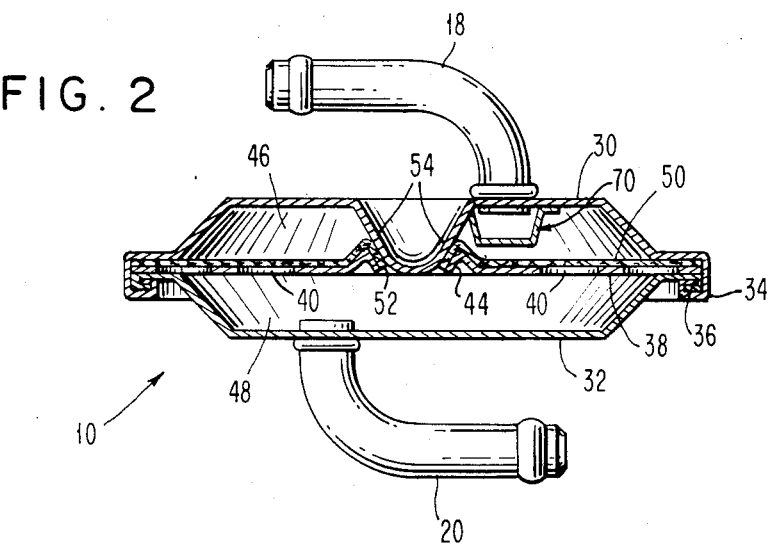
FIG. 2 is a partial cross-sectional view of the filter device taken vertically through the center of the filter device showing the baffle retainer.

Referring to FIG. 2 there is shown a vertical cross section view of the filter device which includes a housing having an upper body wall 30 and a lower body wall 32 having a general pan shape and being joined together in a fluid tight arrangement along the periphery by an interlocking shoulder 34 and flange 36 forming parts of said respective upper and lower body walls 30 and 32. Fluid inlet tube 18 is connected to upper body wall 30 while fluid outlet tube 20 is connected to lower body wall 32. The upper and lower body walls 30 and 32 may, for example, be made of steel.

A support plate 38 is shown in FIG. 4.1 in top view and in FIG. 4.2 in a side view and includes a plurality of spaced apart holes 40 located across most of the surface of the disc-shaped support plate 38. The typical support plate 38 shown in both FIGS. 4.1 and 4.2 may, for example, be made preferably of a cold rolled steel, with a thickness of about 12.5 mils. (0.0125 inches) and a diameter of about 4 inches. At the center of the plate 38 is a large standoff 44 or annular rim 44 surrounding a central valve plate opening 42 and having a generally inverted V-shape. The outer periphery of support plate 38 extends between the shoulder 34 and rim 36 of upper body wall 30 and lower body wall 32. The support plate 38 divides the inside of the filter housing into an inlet or upper chamber 46 and an outlet or lower chamber 48.

Located adjacent to, and in intimate contact with the support plate 38 is a filter material 50 made of a fiber, such as felt, for filtering fine particles which, for example, are larger than about 65–70 microns in size. Referring to FIGS. 5.1 and 5.2, there is shown the filter disc 50 in top view and side view, respectively. As shown in FIG. 2, the filter material 50 is mounted adjacent to the support plate 38 and has a central opening formed by a filter rim 52 which contacts the rim 44 of plate 38 for sealing such opening 42 during normal operating conditions. The filter material 50 extends adjacent the support plate 38 on the inlet chamber side to its outer peripheral edge which is pressed with such plate 38 between the shoulder 34 and rim 36 of the upper and lower walls 30 and 32.

A special baffle retainer 70 for the filter material is mounted on the inlet chamber upper body wall 30 and acts as a baffle for the input fluid flow passing from the inlet tube 18 into the inlet chamber during normal operation when the proper installation was made, and further acts as a safety device to prevent blockage of the inlet tube 18 by the soft filter material 50 in the event of an inadvertent, improper reverse connection of the filter device in the power steering system. Details of baffle retainer 70 are described below.

Figure 3:
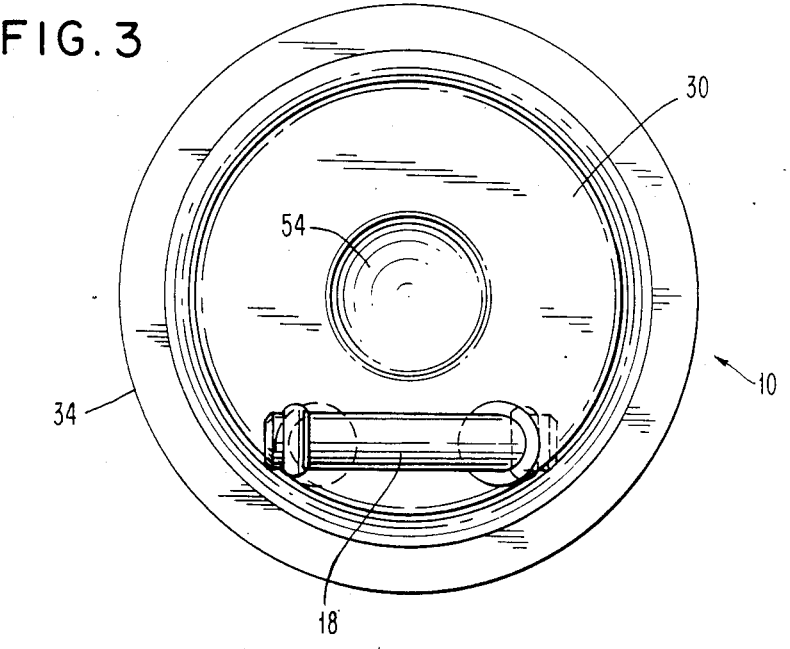
FIG. 3 is a top view of the filter device showing the upper body wall the central valve boss and the fluid inlet tube.

A relief valve is provided by the filter device 10 by means of the combination of a protuberance 54 formed as part of the upper body wall 30 in the central portion and extending, as shown in FIGS. 2 and 3, into the opening defined by both the filter rim 52 and the support plate rim 44. The relief valve is thus formed by the boss 54 which sealingly engages with the filter rim 52 and the support plate rim 44.

Figure 6:
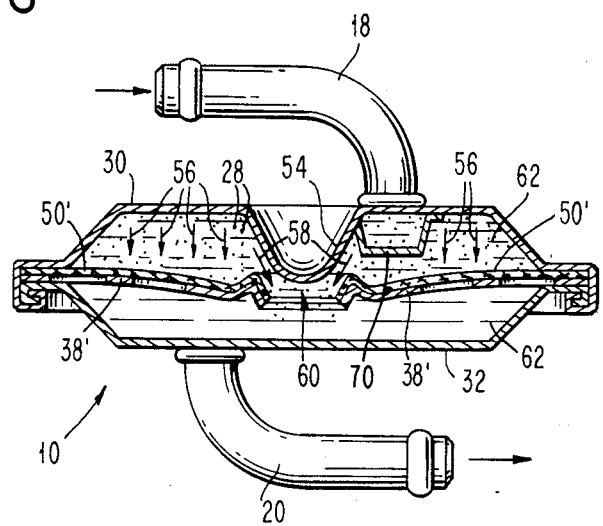
FIG. 6 shows an exaggerated view of the relief valve arrangement shown in FIG. 2, wherein there is indicated the flexed position of the support plate in the open valve position.

Here, it is noted that the support plate 38 is a rigid but yet flexible plate that is designed to flex and bend at is central portion by a predetermined amount of distance when subjected to a given predetermined fluid pressure on such plate 38. The thin plate 38, described in the example of being made of cold rolled steel, has a thickness of about 12.5 mils and, together with the number and size of the holes 40 in the plate 38, will flex and bend outwardly at the center portion by a predetermined amount under the power steering system pressure, which pressure is about 40–50 pounds per square inch (p.s.i.). More particularly, FIG. 6 illustrates the valve operation by a close up and exaggerated view of the relief valve formed by the boxx 54, the support plate 38 and the felt filter 50. Under normal operating conditions when the filter material 50 is filtering out particles from the fluid in the upper inlet chamber 46, the fluid passes through the filter 50 and holes 40 of plate 38 into the lower output chamber 48 where it exits through outlet tube 20. However, should the filter 50 become clogged with the filtered particles such that the pressure in inlet chamber 46 builds to a predetermined amount indicated by the pressure flow arrows 56 in FIG. 6. the support plate 38 will be forced in the direction shown into the position indicated by numeral 38' while the filter material 50 is caused by the pressure to also remain in intimate contact with plate 38 and move into the position indicated by numeral 50'. Such plate movement produces a valve opening 60 whereby the fluid 62 is provided with a relief passage indicated by arrows 58 in such valve opening 60. It is noted that the sealing arrangement is designed to operate under a positive predetermined pressure which builds up under a filter clogging condition such that the flexible plate 38 will move a predetermined distance under such pressure to cause the relief valve opening 60. Under normal operating conditions when the filter is not clogged, minor differences in fluid pressure in the input chamber 46 and, consequently, differences in the differential pressure between input chamber 46 and outlet chamber 48 are such that the relief valve will not accidentally open. This is because of the design of the flexible support plate which has a spring tension that has been set to flex at a predetermined pressure for opening the valve. Furthermore, support plate 38 has a flexible, but, rigid plate characteristic that tends to maintain such plate in a closed valve position under normal fluid pressure conditions when the filter material 50 is not clogged.

The baffle retainer 70 comprises a metal strap having a general U-shape with a top portion 72, two leg portions 74 and 76 and base portions 76 and 80 that are spot welded at 82 and 84 to the upper body wall 30, as shown more specifically in FIGS. 7.1, 7.2 and 7.3. The height h of the baffle retainer 70 is the vertical distance between the base portions 78, 80 and the top portion 72. Baffle retainer 70 is designed with a height h which is slightly less than the height of the upper inlet chamber 46 such that baffle retainer 70 extends from the upper body wall 30 to a point adjacent to the side of the filter disc 50 when in its normal position shown in FIGS. 1 and 2. During normal operation, the baffle retainer 70 acts as a baffle to deflect the stream of fluid, shown in FIGS. 1 and 6, entering the inlet chamber 46 from the opening 86 of inlet tube 18 such that the inlet flow is deflected by top portion 72 out to the sides through the side openings defined by the arms 74 and 76 and top portion 72 of baffle retainer 70. This deflection action of the baffle retainer 70 disperses the inlet flow of fluid such that it is not directed under the ordinary pressures, such as 40–50 p.s.i., onto the one small area of the filter disc 50 located opposite to the opening of inlet tube 18. In this manner, the baffle retainer 70 acts as a baffle for deflecting the fluid flow from its straight direction toward the filter disc 50.

FIG. 8 shows the filter device when a mistake in installation has occurred and the device inlet tube 18 and outlet tube 20 are connected backward in the power steering line such that the fluid is received through the outlet tube 20 into the outlet or lower chamber 48, as indicated by arrows 90 and 92, and passes through the openings in the support plate 38 against and through the filter disc 50 to cause it to deflect against the top portion 70 of baffle retainer 72 and toward the upper body wall 30 as further indicated by numeral 50''. In this fashion, the baffle retainer 70 retains the filter disc 50 near the top portion 72 of such retainer so that the filter disc 50 is not otherwise forced, by the fluid pressure flow, against the end of inlet tube 18 so as to bloc the fluid flow out through such tube 18. It is noted that while the filter disc 50 is intended to pass the fluids therethrough while filtering out fine particles, the covering of the opening 86 by the filter disc 50 could eventually develop an accumulation of particles on the filter disc 50 around the area of the opening 86, thereby clogging such opening and preventing fluid flow. This clogging condition is avoided, or minimized, by the baffle retainer 70.

While the invention has been described above with respect to its preferred embodiments, it should be understood that other forms and embodiments may be made without departing from the spirit and scope of the present invention. For example, while the filter device of the present invention has been described with respect to power steering units, particularly, for automobiles, it is contemplated that such filter device and relief valve may also be used in other applications such as automatic transmissions of both automobiles and other motor driven equipment wherein it is desirable to remove the fine particles accumulating in the fluid. Also, it is noted that while the support plate 38 is shown as a flat-shaped plate, such plate 38 can alternatively have an annular depression , not shown, extending around the annular rim 44 between such rim 44 and the outer periphery of the plate 38. Furthermore, it is noted that the disc of filter material 50 can be made of a fine, metal screen mesh, not shown, in lieu of the felt fiber described above.

What is claimed is:
1. A filter device for filtering the fine solid particles as present in the fluid line of an automotive system comprising:
   a filter housing including an inlet body wall and an outlet body wall, inlet means for receiving fluid under pressure in said housing, and outlet means for passing said fluid out of said housing into said fluid system;

a perforated support plate comprising a thin, disc-shaped substantially rigid material mounted in said filter housing and extending across the interior of said housing for separating said housing into an inlet chamber and an outlet chamber, said support plate having perforations for passing filtered fluid from said inlet chamber to said outlet chamber;

a disc-shaped filter material for filtering solid particles of a given size from said fluid, said filter material being located in said inlet chamber and covering each of said perforations in intimate contact with said support plate for filtering said particles prior to the passage of fluid through said filter material and said perforations to said outlet chamber; and baffle retainer means including a U-shaped strap having a pair of ends mounted on said inlet body wall and extending across said inlet means for deflecting and dispersing the fluid received through said inlet means into said inlet chamber, for providing a more uniform flow of inlet fluid onto said filter material, said baffle retainer strap having a top portion with a height which is adjacent to the side of said filter material to retain said filter material at a predetermined distance from said inlet means, and for preventing said filter material from obstructing said inlet means and clogging said filter device in the event of backward flow of fluid through said filter housing.

2. A filter device as recited in claim 1, wherein said U-shaped strap comprising said baffle retainer means includes two arm portions connected at their respective ends to said top portion to form a U-shape, the other ends of said arm portions being mounted on said inlet body wall, said strap having a width which is sufficient to substantially deflect said inlet fluid off said top portion and an out to the sides of said strap away from the normal direction of said inlet fluid flow.

3. A filter device as recited in claim 2, wherein said U-shaped strap is welded at each of said ends of said arm portions to said inlet body wall, with each welded arm portion being located at opposite sides of said inlet means of said filter housing.

4. A filter device as recited in claim 1, wherein said inlet means includes an inlet tube connected to said inlet body wall for directing inlet fluid into said inlet chamber in a direction toward said filter material.

5. A filter device as recited in claim 1, wherein said U-shaped strap includes said top portion extending between said ends of said strap, said top portion of said strap providing a deflection wall for said fluid which is substantially parallel to said disc-shaped filter material for thereby deflecting and dispersing said inlet fluid in a direction generally parallel to said filter material.

6. A filter device as recited in claim 1, wherein said top portion of said baffle retainer strap has a height which is slightly less than the height of said inlet chamber formed by said inlet body wall and said support plate, whereby said strap extends from said inlet body wall to a point adjacent to the side of said filter material for retaining said filter material at a predetermined distance from said inlet means.

7. A filter device as recited in claim 1, further comprising a relief valve means operating with said support plate, said relief valve means being closed when said support plate is in its normal condition when said filter material acts to filter said solid particles from said fluid, said relief valve means opening to form a valve passage with said support plate when said support plate flexes upon the build up of a predetermined amount of fluid pressure in said inlet chamber when said filter material becomes clogged with said solid particles and said support plate is caused to move away from said relief valve means and thereby opens said relief valve to permit fluid to pass into said outlet chamber.

8. A filter device as recited in claim 7, wherein said relief valve means comprises a relief valve opening and valve seat formed by a central opening in said perforated support plate, and a valve plug portion formed by a boss in said inlet body wall which extends through said inlet chamber and into said valve opening in said support plate thereby providing a valve plug and valve seat action.

9. A filter device as recited in claim 8, wherein said disc-shaped filter material includes a central opening which is in alignment with said valve seat opening in said support plate, whereby said boss portion of said inlet body wall extends into the valve opening formed in both said filter material and said support plate for providing a valve seal with said support plate.

10. A filter device as recited in claim 1, wherein said filter material comprises a disc of felt for filtering fine particles.

11. A filter device as recited in claim 1, wherein said filter material as a diameter which is the same as the diameter of said support plate, and both said filter material and said support plate are mounted in said filter device with their respective peripheral portions pressed between the joined ends of said inlet body wall and said outlet body wall.

12. A filter device for filtering the fine solid particles as present in the fluid line of an automotive system comprising:

a filter housing including an inlet body wall and an outlet body wall, inlet means for receiving fluid under pressure in said housing, and outlet means for passing said fluid out of said housing into said fluid system;

a perforated support plate comprising a thin, disc-shaped substantially rigid material mounted in said filter housing and extending across the interior of said housing for separating said housing into an inlet chamber and an outlet chamber, said support plate having perforations for passing filtered fluid from said inlet chamber to said outlet chamber, said support plate being adapted flex when subjected to a predetermined pressure by said fluid, and said support plate having a central opening and surrounding rim constituting a relief valve opening and valve seat, respectively;

a disc-shaped filter material for filtering solid particles of a given size from said fluid, said filter material being located in said inlet chamber and covering each of said perforations in intimate contact with said support plate for filtering said particles prior to the passage of fluid through said filter material and said perforations to said outlet chamber, said filter material having a central opening in alignment with said relief valve opening in said support plate;

baffle retainer means including a U-shaped strap having a pair of ends mounted on said inlet body wall and extending across said inlet means for deflecting and dispersing the fluid received through said inlet means into said inlet chamber, for providing a more uniform flow of inlet fluid onto said filter material, said baffle retainer strap having a top portion with a height which is adjacent to the side of said filter material to retain said filter material at a predetermined distance from said inlet means, and for preventing said filter material from obstructing said inlet means and clogging said filter device in the event of backward flow of fluid through said filter housing; and said upper body wall having a boss portion which extends through said inlet chamber and into said valve opening in both said filter material and said support plate, said boss portion providing a valve seal with said valve seat rim of said support plate under normal filtering conditions, whereby when said filter material becomes clogged with said particles, said support plate will be caused to move away from said valve boss portion to open said relief valve and permit fluid to pass into said outlet chamber.

* * * * *